Patented July 28, 1931

1,815,965

UNITED STATES PATENT OFFICE

HANS THEODOR BUCHERER, OF CHARLOTTENBURG, GERMANY, ASSIGNOR TO GENERAL ANILINE WORKS, INC., OF NEW YORK, N. Y., A CORPORATION OF DELAWARE

METHOD OF PRODUCING OR DEVELOPING AZO DYES

No Drawing. Application filed March 11, 1926, Serial No. 94,057, and in Germany March 17, 1925.

The so-called nitrosamines of the primary aromatic amines of the general formula R.N=N.O. metal have attained a certain theoretical importance both on account of the surprising stability they possess as compared with the diazonium compounds which are very liable to decomposition, and on account of the particular behaviour or the reactions they display with relation to the usual azo-components. None of the said nitrosamines is of technical or commercial value with the sole exception of the sodium salt corresponding to the p-nitranilin and which is known in the trade under the denomination of Nitrosamine-Red. On account of lack of reactability, however, it was not possible heretofore, except in a few cases, to utilize the stated sodium compound for dye-synthesis immediately, that is to say, without previously isomerizing the same to form a diazonium compound, and these few cases have been practised in cloth-printing only and even for this purpose the additional employment of acids, acid salts or other alkali binding substances has been found to be indispensable.

I have discovered, after much study and research, that I can bring about, under suitable conditions, the formation of a dye even in a decidedly alkaline medium. Moreover I found that the formation of the dye whilst going on by far slower than the coupling of the diazonium compounds, can be effected so as to take a plain course.

The essential conditions to be complied with for the purpose are as follows:

(1) the necessity of avoiding excessive concentration of caustic alkali,
(2) the necessity of employing higher temperatures up to 90° to 100° C.

*Example 1.*—Employment of the antidiazotate from p-nitranilin (nitrosamine-red). Equivalent amounts of the nitrosamine salt and of a slightly soda-alkaline solution of the azo-components such as 2,6 or 2,8 naphthol-sulfonic acid, 2,3,6—naphthol-disulfonic acid, 1,2 or 1,4 naphthylamine-sulfonic acid, resorcin or m-toluylendiamine, are mixed together and the mixture is heated to a temperature of 90° to 100° C. for some time until it is found that the formation of the dye is finished or until the dye components have disappeared. Usually the dyes separate in crystalline form during the reaction. The dye resulting from nitrosamine and 1,8,4,6—amino-naphthol-disulfonic acid is distinguished as regards its behaviour against acids and alkalis with relation to the tones of colour produced thereby; from the monoazo dye resulting from the coupling in an acid medium and appears to result from or form by a coupling action on the naphthol side. It is known to persons versed in the art that this dye could not be produced as a unit or in a united form according to the methods hitherto in use. The supposition of a coupling action on the naphthol side is supported by the fact that naphthol sulfonic acids are more readily capable of coupling with nitrosamine than naphthylamine-sulfonic acids. The particulars above mentioned respecting the 1,8,4, 6—amino-naphthol-disulfonic acid also apply to the corresponding dyes resulting from γ- and j-acids (2,8,6—and 2,5,7—amino-naphthol-sulfonic acids, respectively), which when coupled with diazonium chloride in the manner hitherto employed, also follow a different course of reaction from that which they follow in the process of the present invention. This fact likewise renders the new method valuable in technical application.

The probable course of the reactions is indicated in the following equation:

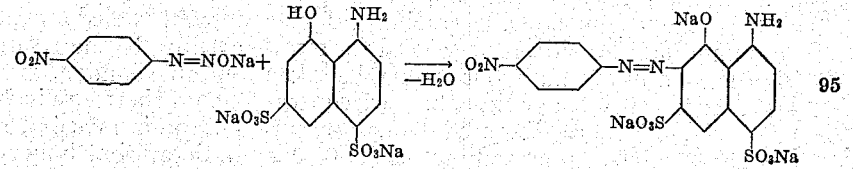

In case of using an azo-component such as β-napthol I ensure a quick coupling, in contradistinction to prior knowledge, by working at a high temperature and by avoiding as far as possible any excess of caustic alkali.

My improved method is also applicable for developing the dye-stuff or colouring matter immediately on the textile fibres just as hitherto practiced in the usual dyeing or padding process by means of acid diazonium compounds, and this way is evidently an advance in the art. If the nitrosamine salt solution is added to the padding bath prior to the padding operation, the development can be brought about by steaming. In case of cloth or fabrics which have been subjected to a preliminary dyeing operation, either a uniform or a partial development may be effected, as desired or required, by way of padding or printing with the nitrosamine salt solution.

*Example 2.*—Production of para-red on the fibres from the nitrosamine of p-nitranilin and β-naphthol.

About one half kilo of a printing dye containing 25 gr of β-naphthol (in the form of its Na-salt), 10 gr. of NaOH dissolved in 100 cc. of water, and the usual additions particularly of thickening substances, is mixed with a quantity of nitrosamine corresponding to 20 gr. of p-nitranilin. A printing dye thus prepared will be stable and lasting for a period of time say twenty four hours. Immediately before the printing operation commences a mixture is to be added to the printing dye which mixture is composed of 50 gr. of bicarbonate of sodium and such a quantity of a thickening agent or incrassative that the total weight of the printing dye will amount to 1 kg. The printing operation finished the cloth or fabric is subjected to a drying operation, a subsequent steaming operation and a final soaping operation.

The probable course of the reactions is indicated in the following equation:

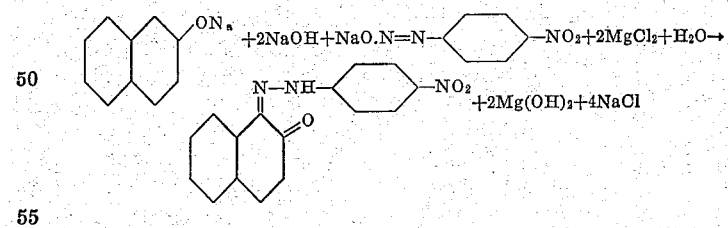

In lieu of bicarbonate also any other suitable alkali binding or neutralizing agents such as magnesium chloride, calcium chloride or ammonium chloride, may be used for binding the surplus of alkali, but it must be taken into account at the same time that two equivalents of NaOH are liberated from β-naphthol and nitrosamine sodium, that is one equivalent from either compound, which must be rendered inactive, particularly in case that the development of the para-red is effected by means of a steaming operation, whereas in case of developing by means of a hanging process the stated amounts of alkali will not be objectionable to the same degree.

In case of developments by means of nitrosamines which are sensitive to any excess of alkali, such as the dye-stuff of a p-nitro-o-anisidin and β-naphthol, it is advisable to remove the caustic alkali completely.

The described method can also be carried out in such manner that only a certain portion of the excess caustic alkali is bound prior to the printing process, whilst the remaining portion (if desired or required, even the whole amount of caustic alkali) will be destroyed after the printing operation by padding the fibres or cloth with an alkali binding agent, such as calcium chloride or the like.

It is obvious that the usual mordants or discharges and reserves as well as the known combinations with other developments may be combined or employed together with my improved method so that the latter will be applicable in quite a large variety of practical cases. At any rate the alkaline nature or condition of the developing fluid will be a noticeable improvement upon the customary acid diazonium compounds hitherto used in the art, even from the standpoint of the dyer and printer.

It will thus be seen that my invention comprises a method of producing azo dyes, which consists in causing an alkali metal compound of a nitrosamine derived from a primary aromatic amino compound, including substitution products thereof, to react, in the presence, or not, of a textile fabric, with a coupling component at a supernormal temperature, preferably at about 90° to 100° C., in the presence of an inorganic salt, such as sodium bicarbonate or an alkaline earth metal salt, which is capable of reducing the alkalinity of the caustic alkali set free by the reaction.

It will be evident that my invention whilst still being adhered to in its main essentials, may be varied and adapted in many ways according to the requirements desired or most suitable under different circumstances. I would therefore have it understood that I do not limit myself to the examples described in detail, but hold myself at liberty to make such departures therefrom as fairly fall within the spirit and scope of my invention.

What I claim is:—

1. A process of making azo dyes which comprises causing an alkali metal compound of a nitrosamine derived from a primary aromatic amino compound to react with a coupling component at a supernormal temperature up to 100° C. in the presence of an inorganic salt capable of reducing the alkalinity of the caustic alkali set free by the reaction.

2. A process of making azo dyes which comprises causing an alkali metal compound of a nitrosamine derived from a primary aromatic amino compound to react with a coupling component at about 90 to 100° C. in the presence of an inorganic salt capable of reducing the alkalinity of the caustic alkali set free by the reaction.

3. A process of making azo dyes which comprises causing an alkali metal compound of a nitrosamine derived from a primary aromatic amino compound to react with a coupling component at about 90 to 100° C. in the presence of sodium bicarbonate.

4. A process of making azo dyes which comprises causing an alkali metal compound of a nitrosamine derived from p-nitranilin to react with a coupling component at a supernormal temperature up to 100° C. in the presence of an inorganic salt capable of reducing the alkalinity of the caustic alkali set free by the reaction.

5. A process of making azo dyes which comprises causing an alkali metal compound of a nitrosamine derived from p-nitranilin to react with a coupling component at about 90 to 100° C. in the presence of an inorganic salt capable of reducing the alkalinity of the caustic alkali set free by the reaction.

6. A process of making azo dyes which comprises causing an alkali metal compound of a nitrosamine derived from p-nitranilin to react with a coupling component at about 90 to 100° C. in the presence of sodium bicarbonate.

In testimony whereof I affix my signature.

HANS THEODOR BUCHERER.